(12) United States Patent
Blythe et al.

(10) Patent No.: US 8,985,088 B2
(45) Date of Patent: Mar. 24, 2015

(54) SYSTEMS AND METHODS FOR CONTROLLING EXHAUST GAS RECIRCULATION

(75) Inventors: Neil Xavier Blythe, Lawrence Park, PA (US); Shawn Michael Gallagher, Lawrence Park, PA (US); James Robert Mischler, Lawrence Park, PA (US); Luke Henry, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 13/562,356

(22) Filed: Jul. 31, 2012

(65) Prior Publication Data

US 2014/0034014 A1    Feb. 6, 2014

(51) Int. Cl.
| | |
|---|---|
| F02B 47/08 | (2006.01) |
| F02M 25/07 | (2006.01) |
| F02D 13/06 | (2006.01) |
| F02D 17/02 | (2006.01) |
| F02D 41/00 | (2006.01) |
| F02D 41/14 | (2006.01) |

(Continued)

(52) U.S. Cl.
CPC ......... *F02D 41/0052* (2013.01); *F02B 29/0412* (2013.01); *F02B 37/004* (2013.01); *F02B 37/18* (2013.01); *F02D 13/0207* (2013.01); *F02D 17/02* (2013.01); *F02D 41/1497* (2013.01); *F02D 2200/1002* (2013.01); *F02M 25/0711* (2013.01); *F02M 25/0727* (2013.01); *F02M 25/0749* (2013.01); *Y02T 10/47* (2013.01)
USPC ............. 123/568.22; 123/568.11; 123/198 F; 123/698; 123/481; 701/102; 60/605.2

(58) Field of Classification Search
CPC ................................ F02B 47/08; F02B 47/10
USPC .......... 123/481, 435, 568.12, 568.11, 568.17, 123/568.21, 568.15, 198 F, 698; 701/104, 701/108
See application file for complete search history.

(56) References Cited

U.S. PATENT DOCUMENTS

| | | | | |
|---|---|---|---|---|
| 4,231,338 A | * | 11/1980 | Sugasawa et al. | ............ 123/681 |
| 5,377,631 A | * | 1/1995 | Schechter | .................. 123/198 F |

(Continued)

FOREIGN PATENT DOCUMENTS

| | | |
|---|---|---|
| DE | 19838725 A1 | 3/2000 |
| DE | 102009028354 A1 | 2/2011 |

OTHER PUBLICATIONS

International Search Report and Written Opinion issued in connection with corresponding Application No. PCT/US2013/047503 on Dec. 10, 2013.

*Primary Examiner* — Lindsay Low
*Assistant Examiner* — George Jin
(74) *Attorney, Agent, or Firm* — GE Global Patent Operation; John A. Kramer

(57) ABSTRACT

Various systems and method for controlling exhaust gas recirculation (EGR) in an internal combustion engine are provided. In one embodiment, a method includes injecting fuel to a subset of cylinders that includes less than all cylinders of a first cylinder group to obtain a target EGR rate. The first cylinder group provides exhaust gas through an exhaust gas recirculation (EGR) passage structure fluidly coupled between the first cylinder group and an intake passage structure. The method further includes injecting fuel to at least one cylinder of a second cylinder group. The second cylinder group provides substantially no exhaust gas through the EGR passage structure.

21 Claims, 6 Drawing Sheets

(51) Int. Cl.
*F02B 29/04* (2006.01)
*F02B 37/00* (2006.01)
*F02B 37/18* (2006.01)
*F02D 13/02* (2006.01)

(56) References Cited

U.S. PATENT DOCUMENTS

| | | | |
|---|---|---|---|
| 5,517,976 A * | 5/1996 | Bachle et al. | 123/568.11 |
| 5,561,602 A * | 10/1996 | Bessler et al. | 701/1 |
| 5,826,563 A * | 10/1998 | Patel et al. | 123/481 |
| 6,138,650 A * | 10/2000 | Bailey | 123/568.12 |
| 6,360,724 B1 | 3/2002 | Suhre et al. | |
| 6,405,705 B1 * | 6/2002 | Dunsworth et al. | 123/305 |
| 6,408,625 B1 | 6/2002 | Woon et al. | |
| 6,543,230 B1 * | 4/2003 | Schmid | 60/605.2 |
| 6,789,531 B1 * | 9/2004 | Remmels | 123/568.11 |
| 6,823,835 B2 | 11/2004 | Dunsworth et al. | |
| 7,444,815 B2 * | 11/2008 | Baumgard et al. | 60/605.2 |
| 7,941,999 B2 * | 5/2011 | Kasper et al. | 60/605.2 |
| 8,316,829 B2 * | 11/2012 | Piper et al. | 123/568.21 |
| 8,418,680 B2 | 4/2013 | Zitzler et al. | |
| 8,566,006 B2 * | 10/2013 | Gibble | 701/103 |
| 8,733,081 B2 * | 5/2014 | Miyashita | 60/278 |
| 2002/0195087 A1 | 12/2002 | Dunsworth et al. | |
| 2009/0013969 A1 * | 1/2009 | Winstead | 123/481 |
| 2009/0241918 A1 * | 10/2009 | Shinagawa | 123/568.11 |
| 2009/0308070 A1 * | 12/2009 | Alger et al. | 60/602 |
| 2010/0043762 A1 * | 2/2010 | Weiss et al. | 123/568.14 |
| 2010/0211294 A1 * | 8/2010 | Soejima | 701/108 |
| 2011/0023829 A1 * | 2/2011 | Miyashita | 123/445 |
| 2011/0048372 A1 * | 3/2011 | Dibble et al. | 123/350 |
| 2011/0253113 A1 * | 10/2011 | Roth et al. | 123/568.12 |
| 2011/0265454 A1 * | 11/2011 | Smith et al. | 60/274 |
| 2011/0283682 A1 * | 11/2011 | Gallagher et al. | 60/274 |
| 2011/0307127 A1 * | 12/2011 | Swenson et al. | 701/21 |
| 2012/0042633 A1 * | 2/2012 | Silvestri et al. | 60/274 |
| 2012/0046853 A1 * | 2/2012 | Silvestri et al. | 701/104 |
| 2012/0078492 A1 | 3/2012 | Freund et al. | |
| 2012/0216530 A1 * | 8/2012 | Flynn et al. | 60/605.2 |
| 2012/0298070 A1 * | 11/2012 | Akinyemi et al. | 123/294 |
| 2012/0323465 A1 * | 12/2012 | Peters et al. | 701/104 |
| 2012/0323470 A1 * | 12/2012 | Klingbeil et al. | 701/108 |
| 2013/0024086 A1 * | 1/2013 | Henry et al. | 701/102 |

* cited by examiner

US 8,985,088 B2

SYSTEMS AND METHODS FOR CONTROLLING EXHAUST GAS RECIRCULATION

FIELD

Embodiments of the subject matter disclosed herein relate to exhaust gas recirculation (EGR) systems and methods.

BACKGROUND

Some engines utilize recirculation of exhaust gas from an engine exhaust system to an engine intake system, a process referred to as exhaust gas recirculation (EGR), to reduce combustion temperatures and regulated emissions. In some examples, a first group of one or more cylinders provides exhaust gas that is directed through an EGR passage coupled between the first group of cylinders and an intake manifold to provide EGR while a second group of one or more cylinders provides substantially no exhaust gas to the EGR passage. In such a configuration, EGR rate is typically controlled through operation of a valve that is located in the EGR passage. The valve position is controlled to vary a mass flow rate of EGR provided to the intake manifold.

BRIEF DESCRIPTION OF THE INVENTION

In embodiments of the invention, under some conditions, exhaust gas recirculation (EGR) composition is controlled in a manner other than by controlling EGR mass flow rate through adjustment/control of an EGR valve. This is because adjusting EGR mass flow rate can be less accurate or can have looser tolerances that result in greater NOx emissions.

Thus, in one embodiment, a method for controlling an engine includes injecting fuel to a subset of cylinders that includes less than all cylinders of a first cylinder group to obtain a target exhaust gas recirculation (EGR) rate. The first cylinder group provides exhaust gas through an EGR passage structure fluidly coupled between the first cylinder group and an intake passage structure. The method further includes injecting fuel to at least one cylinder of a second cylinder group. The second cylinder group provides substantially no exhaust gas through the EGR passage structure.

Operating with some cylinders completing a combustion cycle without combusting is referred to herein as "skip firing." By skip firing cylinders in the cylinder group that provides EGR while injecting fuel to at least one cylinder of the other cylinder group, EGR is adjusted to meet the target EGR rate while achieving tighter tolerances on NOx and particulate matter (PM) emissions relative to controlling an EGR mass flow rate, for example. Moreover, by controlling EGR through skip firing of the cylinders that provide EGR, any valves or other control elements downstream of those cylinders for controlling the flow of EGR can be eliminated from the engine. In this way, the production cost of the engine is reduced. Further still, preferentially skip firing cylinders that provide EGR over cylinders that provide substantially no EGR facilitates the reduction of EGR to low levels that are favorable under some operating conditions.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to various embodiments of systems and methods for controlling exhaust gas recirculation (EGR) in an engine having different groups of cylinders that selectively provide EGR. More particularly, the present description relates to preferentially skip firing cylinders that provide EGR over cylinders that provide substantially no exhaust gas to an EGR passage structure in order to reduce EGR under various conditions. Furthermore, in one example, a fuel injection amount of the cylinders that provide EGR is adjusted to vary the EGR rate with a higher granularity from substantially no EGR to a full capability of the cylinders that provide EGR.

In some embodiments, the engine is configured to be positioned in a vehicle, such as a rail vehicle. The above described methods and configurations are particularly advantageous in a rail vehicle due to the sustained periods of low load operation rail vehicles undergo, for example sitting at idle mode during loading and unloading of cargo, idling in the yard, or other idle operation. In one example, "low-load" operation comprises a mode of operation of the engine where a relatively low amount of work is performed by the engine, for example, low-load operation is less than 50% of maximum engine load. Conversely, a "high-load" operation of the engine comprises a mode of operation where a relatively higher amount of work is performed by the engine, for example operation at greater than 50% maximum engine load.

In some embodiments, the system and methods for controlling the EGR rate by skip firing the cylinders that provide EGR is employed to de-rate engine output during some conditions. For example, this approach is particularly applicable to tunnel operation. Specifically, during tunnel operation (referring to a vehicle traveling through a tunnel), the ambient temperature in the tunnel is increased due to the inherent trapping of exhaust gas expelled from the engine in the confines of the tunnel. Thus, the performance of a rail vehicle (e.g., rate at which the rail vehicle travels through the tunnel) can be increased by skip firing one or more cylinders that provide EGR to increase the air/fuel ratio and reduce the need to de-rate the engine. Moreover, combustion temperatures, heat rejected to the tunnel, and the heat load of the EGR cooler is reduced.

Figure 1:
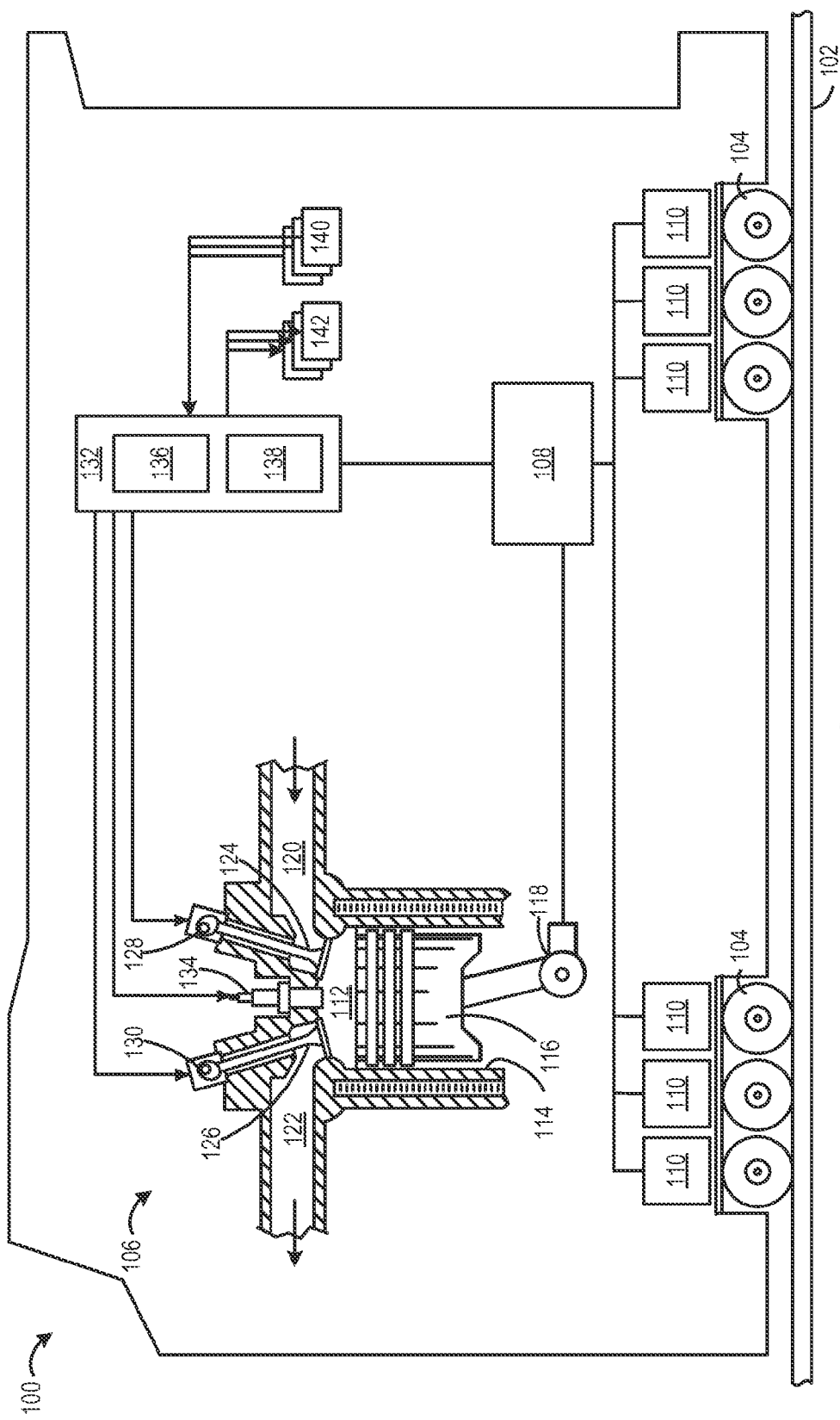
FIG. 1 shows a schematic diagram of a rail vehicle according to an embodiment of the present disclosure.

FIG. 1 schematically shows an embodiment of a vehicle system 100 (e.g., a locomotive system), herein depicted as a rail vehicle, configured to run on a rail 102 using a plurality of wheels 104. The rail vehicle 100 includes an engine system 106. In other non-limiting embodiments, the engine system 106 is a stationary engine system, such as in a power-plant application, and in yet other applications, the engine is used in a ship, on-highway vehicle, off-highway vehicle, or other propulsion system.

In one example, the rail vehicle 100 is a diesel-electric vehicle. For example, the engine system 106 includes a diesel engine that generates a torque output that is transmitted to a generator 108. The generator 108 produces electrical power that is stored and/or applied for subsequent propagation to a variety of downstream electrical components. For example, the generator 108 provides electrical power to a plurality of traction motors 110. As depicted, the plurality of traction motors 110 are each connected to one of a plurality of wheels 104 to provide tractive power to propel the rail vehicle 100. One example rail vehicle configuration includes one traction motor per axle (wheel pair). As depicted herein, six traction motors correspond to each of six pairs of wheels of the rail vehicle.

A combustion chamber (i.e., cylinder) 112 of engine 106 includes combustion chamber walls 114 with a piston 116 positioned therein. The piston 116 is coupled to a crankshaft 118 so that reciprocating motion of the piston is translated into rotational motion of the crankshaft. In some embodiments, the engine 106 is a four-stroke engine in which each of the cylinders fires in a firing order during two revolutions of the crankshaft 118. In other embodiments, the engine 106 is a two-stroke engine in which each of the cylinders fires in a firing order during one revolution of the crankshaft 118.

The combustion chamber 112 receives intake air from an intake passage structure 120 and exhausts combustion gases to an exhaust passage structure 122. The intake passage structure 120 and the exhaust passage structure 122 selectively communicate with the combustion chamber 112 by an intake valve 124 and an exhaust valve 126. In some embodiments, the combustion chamber 112 includes two or more intake valves and/or two or more exhaust valves.

In this example, the intake valve 124 and exhaust valve 126 are controlled by cam actuation systems 128 and 130, respectively. Cam actuation systems 128 and 130 each include one or more camshafts and utilizes one or more of cam profile switching (CPS), variable cam timing (VCT), variable valve timing (VVT) and/or variable valve lift (VVL) systems that is operated by a controller 132 to vary valve operation.

A fuel injector 134 is shown coupled directly to cylinder 112 for injecting fuel directly therein. In this manner, fuel injector 134 provides what is known as direct injection of a fuel into combustion cylinder 112. In one example, the fuel is diesel fuel that is combusted in the engine through compression ignition. In other non-limiting embodiments, the fuel is natural gas, and/or gasoline, kerosene, biodiesel, or other petroleum distillates of similar density, that are combusted in the engine through compression ignition (and/or spark ignition).

The controller 132 at least partially controls operation of the vehicle system 100 and the engine 106. The controller 132 includes a microprocessor unit (e.g., a processor) 136 and an electronic storage medium (a.k.a., a computer-readable storage medium) 138. For example, the computer-readable storage medium includes one or more of a read-only memory chip, random access memory, etc. The computer readable storage medium 138 holds instructions that when executed by the microprocessor unit 136 executes programs for controlling operation of the engine 106 as well as methods discussed in further detail below with reference to FIGS. 3-5.

The controller 132, while overseeing control and management of the vehicle system 100, is configured to receive signals from a variety of engine sensors 140 in order to determine operating parameters and operating conditions, and correspondingly adjust various engine actuators 142 to control operation of the vehicle system 100. For example, the controller 132 receives sensor signals indicative of air-fuel ratio, engine speed, engine load, engine temperature, ambient temperature, intake manifold temperature, exhaust temperature, intake manifold pressure (boost pressure), exhaust pressure, ambient altitude, intake manifold oxygen concentration, combustion stability, particulate matter concentration, and NOx emissions etc. For example, the controller 132 adjusts actuators including fuel injectors, intake and exhaust valves, bypass valves, flow valves, etc. In some embodiments, the controller 132 controls a frequency and/or duration of fuel injection individually for each fuel injector 134 of the engine 106. For example, under some conditions, an amount of fuel injected into cylinders of a first cylinder group is different than an amount of fuel injected into cylinders of a second cylinder group. Furthermore, under some conditions, a number of cylinders in which fuel is injected differs between different cylinder groups.

As another example, one of the sensing devices 140 includes a global positioning system (GPS) receiver. The controller 132 determines (e.g., through estimation or calculation) a geographic position (e.g., coordinates) of the vehicle system 100 using signals from GPS receiver. Geographic features in the path of the vehicle system 100, such as features on or around the rail 102 of the rail vehicle 100, is signaled by an operator or calculated. In some implementations, the sensing devices 140 include a route-feature database. The route-feature database includes information describing different features and regulations that are considered as environmental conditions on a route of the vehicle system 100. In one example, designated geographic features and their respective GPS positions are stored in the route-feature database. A distance between the rail vehicle 100 and any one of the set of designated geographic features is calculated so that the nearest geographic feature and its distance are determined. Non-limiting examples of geographic features that are stored in a set of designated geographic features include a tunnel, a tunnel entrance, a tunnel exit, a geographic region having different emissions restrictions, a steep grade, a city boundary, and a restricted speed boundary. Further, the route-feature database includes stored information about the predefined geographic features, such as length of a tunnel and grade of the tunnel.

In one example, the controller 132 is operable to determine a tunnel condition based on information received from the GPS receiver and/or route-feature database. For example, a tunnel condition includes operation of the vehicle system within a tunnel. Further, the beginning and end of the tunnel condition are determined in order to accurately adjust operation of the vehicle system. In another example, the controller 132 is operable to determine a tunnel condition based on ambient temperature and intake manifold oxygen concentration.

As described above, FIG. 1 shows only one cylinder of a multi-cylinder engine, however, each cylinder similarly includes its own set of intake/exhaust valves, fuel injector, etc.

Figure 2:
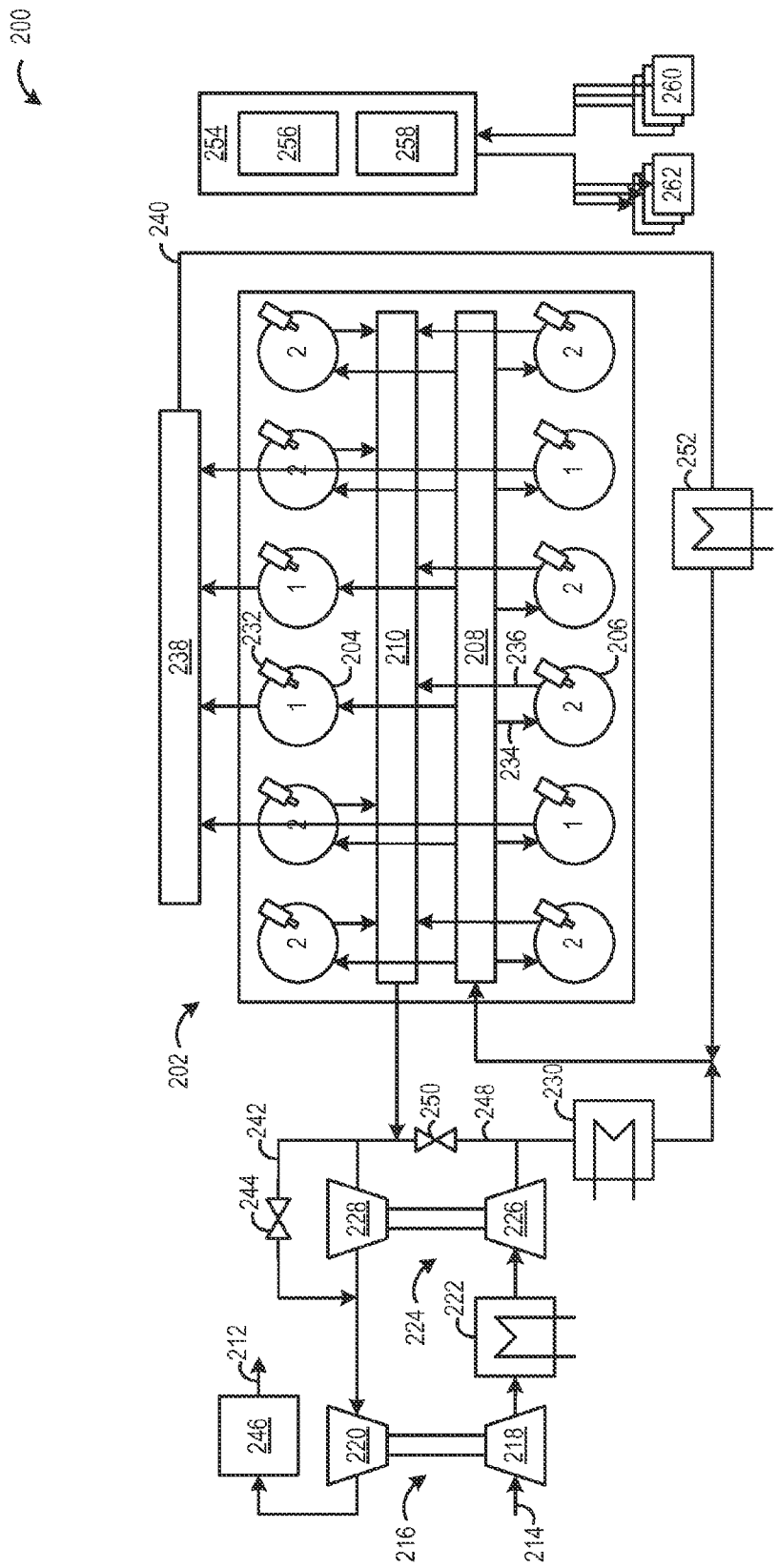
FIG. 2 shows a schematic diagram of an engine according to an embodiment of the present disclosure.

FIG. 2 schematically shows an embodiment of an engine system 200 including a plurality of cylinders 202. The plurality of cylinders 202 is organized into a first cylinder group 204 and a second cylinder group 206. Note that "first" and "second" are labels to denote the cylinders of the first and second cylinder groups, respectively. In one example, the engine system 200 is implemented in a vehicle, such as the vehicle system 100 shown in FIG. 1.

The first cylinder group 204 provides exhaust gas that is directed to an intake manifold 208 of the engine system 200. The intake manifold refers to a passage structure or passages that link to cylinder input ports for providing intake air to the cylinders. In the illustrated embodiment, the first cylinder group 204 provides exhaust gas exclusively to the intake manifold 208. In other words, the first cylinder group 204 is not coupled to an exhaust manifold 210, and further is not directly fluidly coupled to an exhaust passage structure 212 that expels exhaust gas to the atmosphere.

The second cylinder group 206 is coupled to the exhaust manifold 210. Under some conditions, the second cylinder group 206 provides exhaust gas that is directed through the exhaust passage structure 212 and expelled to the atmosphere. Under some conditions, the second cylinder group 206 provides exhaust gas that is directed through a bypass passage structure 248 to the intake manifold 208. In other words, in the illustrated embodiment, the first cylinder group provides exhaust gas merely for EGR and the second cylinder group selectively provides exhaust gas for EGR or to be expelled to the atmosphere. In some embodiments, the first cylinder group is exclusive of the second cylinder group. "Exclusive" means that no cylinder of the first cylinder group is included in the second cylinder group. In the illustrated embodiment, the engine 200 is a V-12 engine having twelve cylinders. In other examples, the engine is a V-6, V-8, V-10, V-16, I-4, I-6, I-8, opposed 4, or another engine type. It will be appreciated that each of the cylinder groups includes a suitable number of cylinders. Furthermore, the engine system includes a suitable number of cylinder groups.

The intake manifold 208 couples to the first cylinder group 204 and the second cylinder group 206. An intake passage structure 214 is coupled to the intake manifold 208 to supply fresh air to the intake manifold 208 for combustion. A staged or series turbocharger setup including a first turbocharger 216 and a second turbocharger 224 is positioned in the intake passage structure 214 to compress intake air. The first turbocharger 216 includes a first compressor 218 positioned in the intake passage structure 214 and a first turbine 220 positioned in the exhaust passage structure 212. The first turbine 220 is driven at least partially by exhaust gas provided by the second cylinder group 206 through the exhaust manifold 210. A first liquid-cooled charge air cooler 222 is positioned in the intake passage structure 214 downstream of the first compressor 218. The second turbocharger 224 includes a second compressor 226 positioned in the intake passage structure 214 downstream of the first cooler 222 and a second turbine 228 positioned in the exhaust passage structure 212 upstream of the first turbine 220. The second turbine 228 is driven at least partially by exhaust gas provided by the second cylinder group 206 through the exhaust manifold 210. A second liquid-cooled charge air cooler 230 is positioned in the intake passage structure 214 downstream of the second compressor 226.

In the illustrated implementation, the engine system 200 does not include a throttle valve positioned in the intake passage structure 214. However, in some implementations, the intake passage structure 120 includes a throttle valve positioned downstream of the second compressor 226.

Each of the plurality of cylinders 202 includes a fuel injector 232 operable to inject fuel into that cylinder, at least one intake port 234 that is operable to receive combustion air from the intake manifold 208, and at least one exhaust port 236 that is operable to exhaust gas to an exhaust manifold. An exhaust manifold (a.k.a., an EGR manifold) 238 is coupled to the first cylinder group 204 to receive exhaust gas from the first cylinder group. In the illustrated embodiment, the EGR manifold 238 is not coupled to the second cylinder group 206. An EGR passage structure 240 is coupled between the EGR manifold 238 and the intake passage structure 214. Under some conditions, exhaust gas provided by the first cylinder group 204 flows through the EGR passage structure 240 into the intake passage structure 214, where it mixes with fresh intake air and the mixture is provided to the plurality of cylinders 202 through the intake manifold 208 for combustion. In the illustrated embodiment, the EGR passage structure 240 is not coupled to the exhaust manifold 210. A liquid-cooled EGR cooler 252 is positioned in the EGR passage structure 240 to cool exhaust gas before the exhaust gas is circulated to the intake manifold 208.

In the illustrated embodiment, the EGR passage structure 240 does not include a control device operable to control flow of exhaust gas to the intake passage structure. In other words, there are no valves or other control elements positioned downstream of the first cylinder group for controlling the flow of EGR. However, it will be appreciated that in some embodiments, the EGR passage structure includes one or more valves for controlling the flow of exhaust gas provided by the first cylinder group.

The exhaust manifold 210 is coupled to the second cylinder group 206 to receive exhaust gas from the second cylinder group. In the illustrated embodiment, the exhaust manifold 210 is not coupled to the first cylinder group 204. Under some conditions, exhaust gas provided by the second cylinder group 206 travels from the exhaust manifold 210, through the second turbine 228 of the second turbocharger 224, through the first turbine 220 of the first turbocharger 216 to be expelled from the exhaust passage structure 212 into the atmosphere. Under some conditions, the exhaust gas bypasses the second turbine 228 through an exhaust bypass passage structure 242. An exhaust bypass valve 244 is positioned in the exhaust bypass passage structure 242. The exhaust bypass valve 244 is operable to control flow of exhaust gas through the exhaust bypass passage structure 242. For example, the bypass valve 244 is adjusted to bypass the second turbine 228 to lower boost pressure under some conditions.

An exhaust gas treatment system 246 is provided in the exhaust passage structure 212, downstream of the first turbine 220. The exhaust gas treatment system 246 treats exhaust gas before it is released to the atmosphere. For example, the exhaust gas treatment system includes a selective catalytic reduction (SCR) system, a diesel oxidation catalyst (DOC), a diesel particulate filter (DPF), various other emission control devices, or combinations thereof.

A bypass passage structure 248 is coupled between the exhaust passage structure 212 and the intake passage structure 214. More particularly, the bypass passage structure 248 is positioned between a point in the exhaust passage structure 212 upstream of the second turbine 228 and downstream of the exhaust manifold 210 and a point in the intake passage structure 214 downstream of the second compressor 226 and upstream of the second cooler 230. Under some conditions, exhaust gas provided by the second cylinder group flows from the exhaust passage structure 212, through the bypass passage structure 248, to the intake passage structure 214 to provide EGR to the plurality of cylinders 202. Furthermore, under some conditions, intake air flows from the intake passage structure 214, through the bypass passage structure 248, and to the exhaust passage structure 212 to accelerate the turbines of the turbochargers. A bypass valve 250 is positioned in the bypass passage structure to control flow of exhaust gas or intake air through the bypass passage structure 248.

A controller 254 includes a processor 256 and computer-readable medium 258 having non-transient instructions that when executed by the processor 256 execute control routines to control the engine 200 and more particularly control EGR during various operating conditions. The controller 254 receives signals from a variety of engine sensors 260 in order to determine operating parameters and operating conditions, and correspondingly adjusts various engine actuators 262.

In one embodiment, the controller 254 is operable to determine a target EGR rate. In one example, the target EGR rate is determined based on one or more of engine load, engine speed, combustion stability, particulate matter concentration, intake manifold oxygen concentration, or NOx emissions. Further, the controller 254 is operable to control injection of fuel to a subset of cylinders that includes less than all cylinders of the first cylinder group to obtain the target EGR rate, and to control injection of fuel to each cylinder of the second cylinder group. In other words, the controller is configured to control skip firing of the cylinder group that provides exhaust gas to the EGR passage structure and to control fueling of each cylinder of the other cylinder group that does not provide exhaust gas to the EGR passage structure. In some embodiments, the controller controls fuel injection such that fuel is injected to only the subset of cylinders, and substantially no fuel is injected into members of the first cylinder group that are not in the subset. By skip firing or shutting off the fuel to one or more cylinders that comprise the subset of the first cylinder group, the amount of exhaust produced by the non-firing cylinders is reduced to zero, thus reducing the total amount of exhaust gas recirculated to the intake manifold.

For example, during skip-fire operation, in one combustion cycle, at least one but fewer than all the cylinders of the first cylinder group are fired while every cylinder from the second cylinder group is fired. In this manner, across multiple engine cycles, the cylinders of the second cylinder group fires more often than the cylinders of first cylinder group. In some embodiments, the subset is varied so that each cylinder of the first cylinder group fires at some point over multiple combustion cycles. Under some conditions, all cylinders of the first cylinder group are skip-fired in order to reduce the EGR provided by the first cylinder group to substantially zero. In some embodiments, different cylinders are skip fired or partially fuelled during different combustion cycles. For example, a cylinder designated for skip firing may be rotated around after each combustion cycle, or some number of combustion cycles.

Furthermore, the amount of EGR could be further reduced if the fueling were shut off every other cycle. Even finer adjustment of the EGR rate may be attained by skip firing the donor cylinders every 3rd or 4th cycles, etc. In one example, the controller 254 is operable to control injection of fuel to the subset of cylinders of the first cylinder group during a first combustion cycle and to control injection of fuel to each cylinder of the first cylinder group during a second combustion cycle to obtain the target EGR rate. In one example, at least one combustion cycle separates the first combustion cycle and the second engine cycle. In other words, the controller varies the number of combustion cycles between skip fire events in order to obtain the target EGR rate. Such an approach provides more granular adjustment than controlling EGR flow rate through an EGR valve.

In one embodiment, the controller 254 is operable to adjust a fuel injection amount to at least one cylinder of the subset of cylinders of the first cylinder group to obtain the target EGR rate. For example, if less fuel is burned in the active cylinders that are not skip fired in the first cylinder group, the amount of exhaust gasses produced by the first cylinder group are reduced, providing an overall reduction in EGR rate. The combination of skip firing and adjusting fuel injection to the active cylinders of the first cylinder group facilitate variable EGR rate control with very high granularity relative to controlling EGR through EGR flow control.

Moreover, aside from the challenging controls and the adverse environment in which an EGR valve operates, a further complication of the EGR flow control approach is that it shifts an operating point of the turbochargers towards a choke condition. In other words, if all of the exhaust of the donating cylinders is combined with the exhaust of the non donating cylinders, the turbocharger would need to be approximately 50% larger in order to handle the combined flow. As such, the turbocharger would be sub-optimized under various operating conditions in order to accommodate the large range of exhaust flow. By varying the EGR rate with skip fire and/or reduced fueling of the donor cylinders, the exhaust flow to the turbocharger could be held relatively constant, thus enabling optimized (or at least improved) performance of the turbochargers over a very broad operating range.

In one embodiment, the controller 254 is operable to adjust a fuel injection amount to at least one cylinder of the second cylinder group dependent upon the first cylinder fuel injection adjustment to attain or maintain a target torque output provided by the first cylinder group and the second cylinder group. In some embodiments, the fuel injection amount of the second cylinder group is adjusted to attain or maintain an operating parameter other than torque output.

Furthermore, in another embodiment, the controller 254 is additionally or alternatively operable responsive to a tunnel condition. More specifically, the controller is configured, during a tunnel condition, to determine a second EGR rate that has a higher oxygen concentration than the target EGR rate, and to control injection of fuel to less than all cylinders of the subset of cylinders of the first cylinder group to obtain the second EGR rate. Furthermore, in another embodiment, the controller 254 is additionally or alternatively operable, in response to the tunnel condition, to determine a target power level, and to control injection of fuel to less than all cylinders of the subset of cylinders of the first cylinder group to obtain the target power level. By skip firing one or more cylinders that provide EGR, overall power output of the engine can be reduced, with the added benefit of increasing the combustion air/fuel ratio and reducing the heat rejected to the EGR cooler.

Furthermore, in another embodiment, the controller 254 is additionally or alternatively operable responsive to an ambient temperature being greater than a temperature threshold value or an ambient air pressure being less than a pressure threshold value. More specifically, during such a condition, the controller is configured to determine a second EGR rate that has a higher oxygen concentration than the target EGR rate, and to control injection of fuel to less than all cylinders of the subset of cylinders of the first cylinder group to obtain the second EGR rate. By skip firing more cylinders that provide EGR during adverse ambient conditions (e.g., high temperature or low density air), the heat load on the EGR cooler is reduced.

Figure 3:
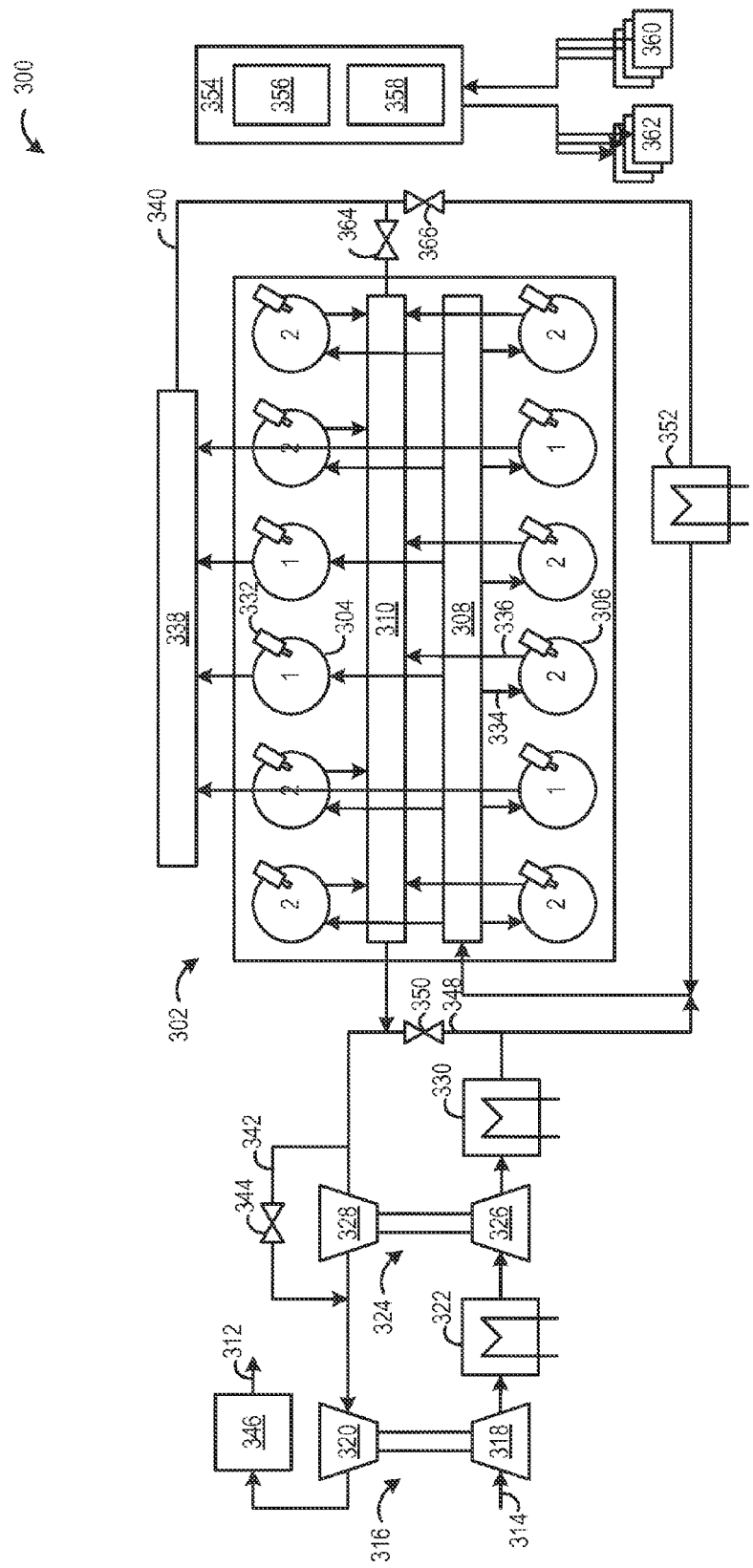
FIG. 3 shows a schematic diagram of another engine according to an embodiment of the present disclosure.

FIG. 3 schematically shows another embodiment of an engine system 300. Components of the engine system 300 that are substantially the same as those of the engine system 200 are identified in the same way and are described no further. However, it will be noted that components identified in the same way in different embodiments of the present disclosure can be at least partly different.

The engine system 300 includes additional valves in the EGR passage structure that allow the first cylinder group and/or the second cylinder group to selectively provide exhaust gas to the intake manifold and/or the exhaust manifold. In other words, in the illustrated embodiment, the first cylinder group can provide exhaust gas for EGR and/or to the exhaust passage structure. In particular, the EGR passage structure 340 is selectively fluidly coupled to the exhaust manifold 310. An EGR bypass valve 364 is positioned in the EGR passage structure 340. The EGR bypass valve 364 is operable to control the flow of exhaust gas from the first cylinder group 304 through the EGR passage structure 340 to the exhaust manifold 310 and/or the exhaust passage structure 312.

An EGR flow valve 366 is positioned in the EGR passage structure 340 between EGR manifold 338 and the EGR cooler 352. The EGR flow valve 366 is operable to control EGR flow through the EGR passage structure to the EGR cooler 352. The EGR bypass valve 364 and the EGR flow valve 366 are cooperatively controlled by the controller 354 to direct exhaust gas flow from the first cylinder group 304 based on operating conditions.

In the illustrated embodiment, the bypass passage structure 348 is positioned downstream of the second cooler 330. As such, hot exhaust gas is passed through the bypass passage to the intake passage without being cooled by the second cooler. By not cooling the exhaust gas with the second cooler, the exhaust gas heats the cylinder more quickly relative to EGR that is cooled by the second cooler. Although it will be appreciated that in some embodiments the bypass passage structure is positioned upstream of the second cooler.

In one embodiment, the controller 354 is operable to close the EGR bypass valve 364, open the EGR flow valve 366, control fuel injection to a subset of cylinders that includes less than all cylinder of the first cylinder group to obtain a target EGR rate, and control fuel injection to each cylinder of the second cylinder group. In other words, the controller controls skip firing of the cylinder group that provides exhaust gas to the EGR passage structure and control fueling of cylinders of the other cylinder group that does not provide exhaust gas to the EGR passage structure. By skip firing or shutting off the fuel to one or more cylinders that comprise the subset of the first cylinder group, the amount of exhaust produced by the non firing cylinders is reduced to zero, thus reducing the total amount of exhaust gas recirculated to the intake manifold.

Furthermore, in another embodiment, the controller 354 is operable to adjust an opening position of the EGR bypass valve and an opening position of the EGR flow valve to control a flow of exhaust gas provided to the EGR passage to obtain the target EGR rate.

Figure 4:
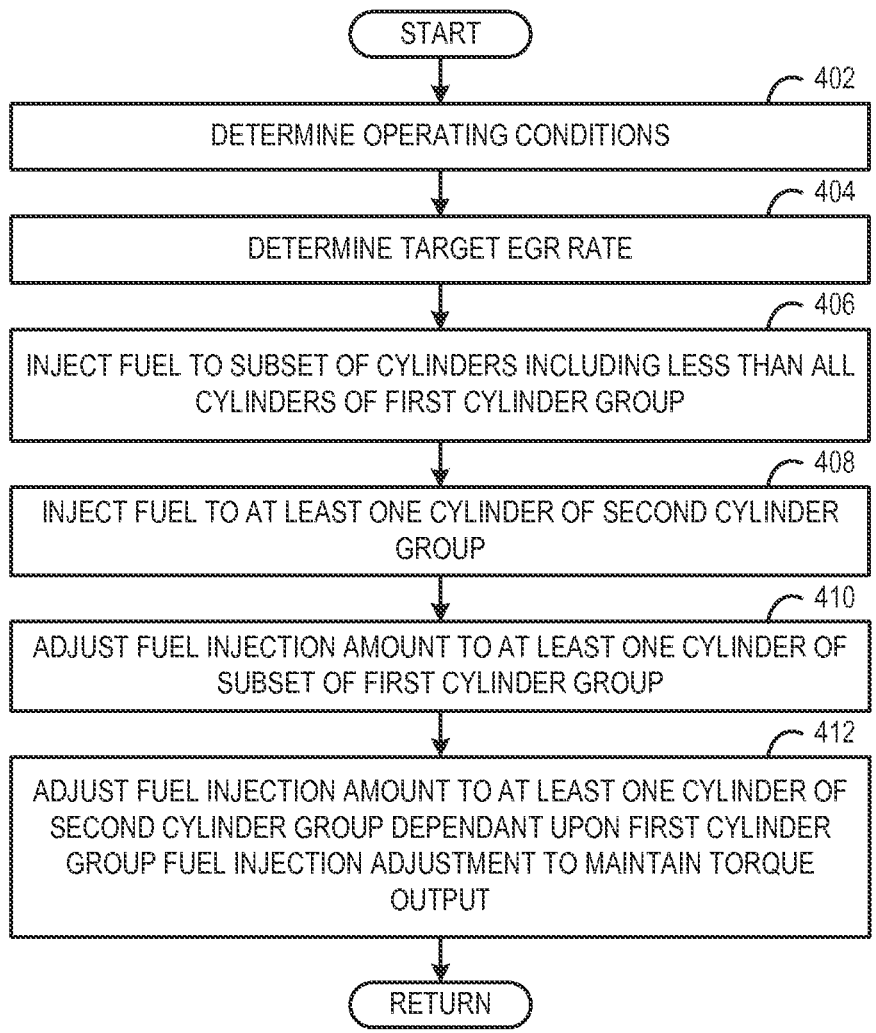
FIG. 4 shows a flow chart of an embodiment of a method for controlling EGR in an engine by skip firing cylinders that provide EGR.

FIG. 4 shows a flow chart of an embodiment of a method 400 for controlling EGR in an engine. In one embodiment, the method 400 is executed by the controller 142 in FIG. 1 or the controller 254 in FIG. 2. At 402, the method 400 includes determining operating conditions. For example, operating conditions may be determined based on operating parameters indicative of sensor signals received from sensors coupled to the engine, such as intake pressure, exhaust pressure, engine temperature, ambient temperature, air-fuel ratio, engine speed, engine load, exhaust temperature, exhaust pressure, ambient pressure, ambient altitude, etc.

At 404, the method 400 includes determining a target EGR rate. In one embodiment, the target EGR rate is determined based on one or more of engine load, engine speed, combustion stability, particulate matter concentration, intake manifold oxygen concentration, or NOx emissions.

At 406, the method 400 includes injecting fuel to a subset of cylinders that includes less than all cylinders of a first cylinder group to obtain the target EGR rate. In one embodiment, the method includes injection fuel to only cylinders in the subset of the first cylinder group and no fuel is injected to members of the first cylinder group that are not in the subset. In one embodiment, the first cylinder group provides exhaust gas through an EGR passage fluidly coupled between the first cylinder group and an intake passage. For example, the subset of cylinders receiving fuel is increased as the target EGR rate increases and the subset of cylinders receiving fuel is decreased as the target EGR decreases. For example, injecting fuel to the subset of cylinders of the first cylinder group can be performed every combustion cycle, every other combustion cycle, every $3^{rd}$ or $4^{th}$ combustion cycle, etc. over a designated number of combustion cycles to obtain the target EGR rate.

At 408, the method 400 includes injecting fuel to at least one cylinder of a second cylinder group. The second cylinder group provides substantially no exhaust gas through the EGR passage. For example, the second cylinder group provides exhaust to an exhaust passage that fluidly couples to the atmosphere instead of providing exhaust gas to the EGR passage. It will be appreciated that a number of cylinders of the first cylinder group are fueled/fired less often than a number of cylinders of the second cylinder group over a designated number of combustion cycles. In one embodiment, the method 400 includes injection fuel to each cylinder of the second cylinder group.

At 410, the method 400 includes adjusting a fuel injection amount to at least one cylinder of the subset of cylinders of the first cylinder group to obtain the target EGR rate.

At 412, the method 400 includes adjusting a fuel injection amount to at least one cylinder of the second cylinder group dependent upon the first cylinder group fuel injection adjustment to attain or maintain a target torque output provided by the first cylinder group and the second cylinder group. For example, if the fuel injection amount of one or more cylinders of the subset of the first cylinder group is decreased to obtain the target EGR rate, then a fuel injection amount of one or more cylinder of the second cylinder group is increased by a corresponding amount.

By skip firing cylinders that provide EGR while fueling cylinders that provide substantially no EGR, more accurate and less complicated EGR control is achieved relative to an approach that employs EGR valves in the EGR passage. Accordingly, such valve that would otherwise be necessary to direct some of the EGR gasses into the non-EGR gas stream can be potentially eliminated from the engine. Moreover, by eliminating valves from the EGR passage, the turbocharger can be suitably matched to an exhaust flow of a fixed number of cylinders, thus minimizing a map width of the turbocharger and correspondingly more efficient operation over a broader range of operating conditions. In other words, by varying the EGR rate with skip fire or reduced fueling of the cylinders that provide EGR, the exhaust flow to the turbocharger could be held relatively constant, thus enabling optimized performance of the turbochargers over a very broad operating range.

Figure 5:
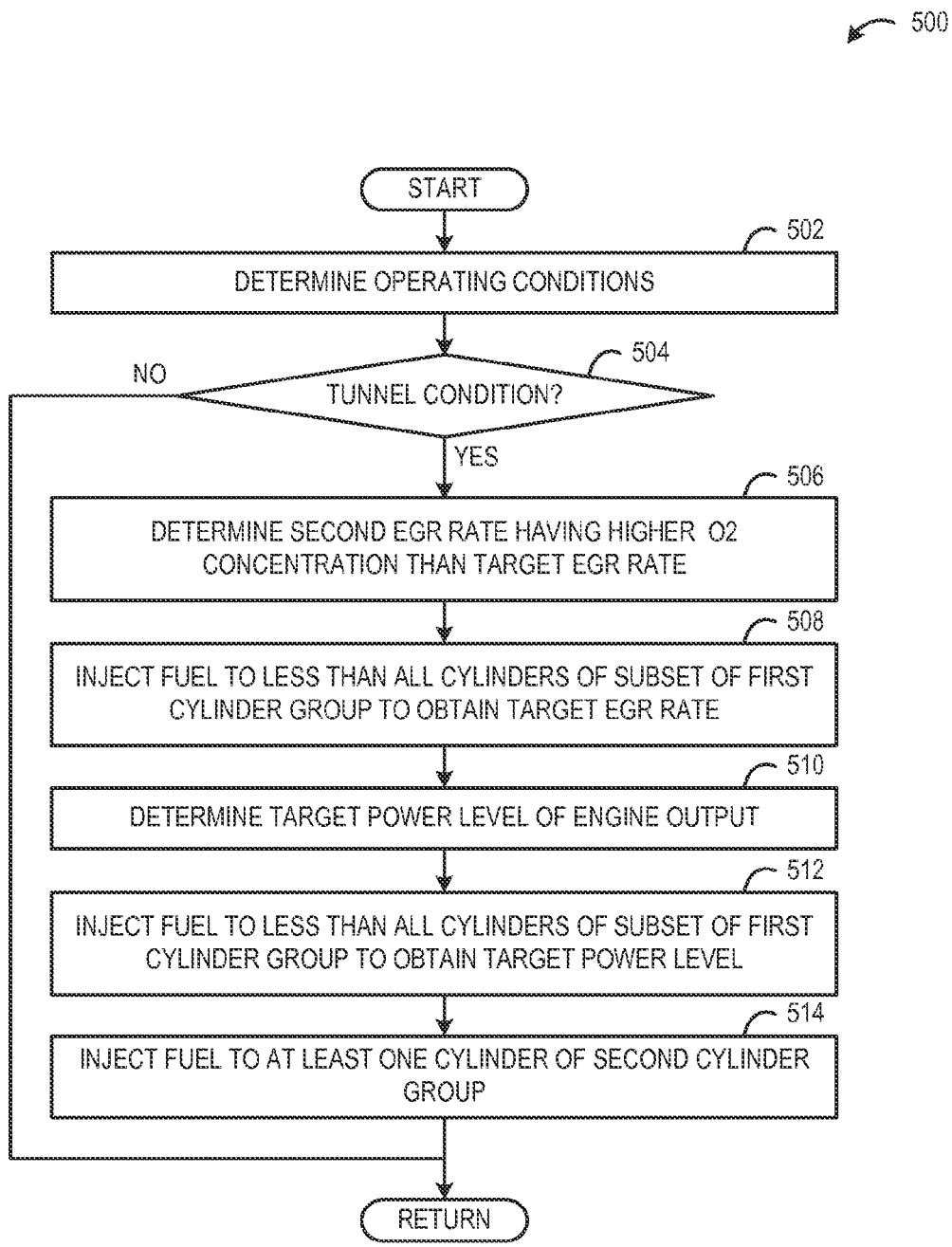
FIG. 5 shows a flow chart of another embodiment of a method for controlling EGR in an engine by skip firing during a tunnel condition.

FIG. 5 shows a flow chart of an embodiment of a method 500 for controlling EGR in an engine during a tunnel condition. In one embodiment, the method 500 is executed by the controller 132 in FIG. 1 or the controller 254 in FIG. 2. At 502, the method 500 includes determining operating conditions. The method 500 is executed alone or in combination with the method 300 shown in FIG. 3.

At 504, the method 500 includes determining whether there is a tunnel condition. For example, the tunnel condition includes a locomotive or other vehicle entering or operating in a tunnel. In one embodiment, a tunnel condition is determined based on GPS information and/or route-feature information. In another embodiment, the tunnel condition is determined based on ambient temperature and intake manifold oxygen concentration. If it is determined that there is a tunnel condition, then the method 500 moves to 506. Otherwise, the method 500 returns to other operations.

At 506, the method 500 includes determining a second EGR rate that has a higher oxygen concentration than the target EGR rate. For example, the target EGR rate is determined based on operation outside of the tunnel. The second EGR rate has a higher oxygen concentration than the target EGR rate due to the reduced fresh air inducted during operation in the tunnel due to expelled exhaust gas being trapped in the tunnel. Moreover, the second EGR rate is increased relative to the target EGR rate due to the reduced heat rejection capability of the locomotive and resultant increased fluid temperatures (e.g., oil, water, air) that occurred during tunnel operation.

At 508, the method 500 includes injecting fuel to less than all cylinders of the subset of cylinders of the first cylinder group to obtain the second EGR rate. In one embodiment, the method includes injection fuel to only cylinders in the subset of the first cylinder group and no fuel is injected to members of the first cylinder group that are not in the subset. In other words, the number of cylinders in the subset are decreased that are fueled is decreased in order to further reduce the EGR and increase the amount of intake air that is provided to the cylinder to achieve the second EGR rate. In one embodiment, all cylinders of the first cylinder group are skip fired to reduce the EGR rate to the second EGR rate.

At 510, the method 500 includes determining a target power level output by the engine. For example, the engine is de-rated to obtain the target power level. In one example, the target power level is determined based on one or more of engine coolant temperature, oil temperature, combustion stability, air/fuel ratio, etc.

At 512, the method 500 includes injecting fuel to less than all cylinders of the subset of cylinders of the first cylinder group to obtain the target power level.

At 514, the method 500 includes injecting fuel to at least one cylinder of the second cylinder group. In one embodiment, the method includes injecting fuel to each cylinder of the second cylinder group.

By skip firing the cylinders that provide EGR to control the EGR rate and de-rate the engine, the performance of the vehicle (e.g., a rate at which the vehicle travels thru the tunnel) can be increased. Moreover, heat rejected to the tunnel is reduced by reducing the heat load of the EGR cooling system, as well as lowering the exhaust temperature due to decreased EGR and/or increased air/fuel ratio.

Figure 6:
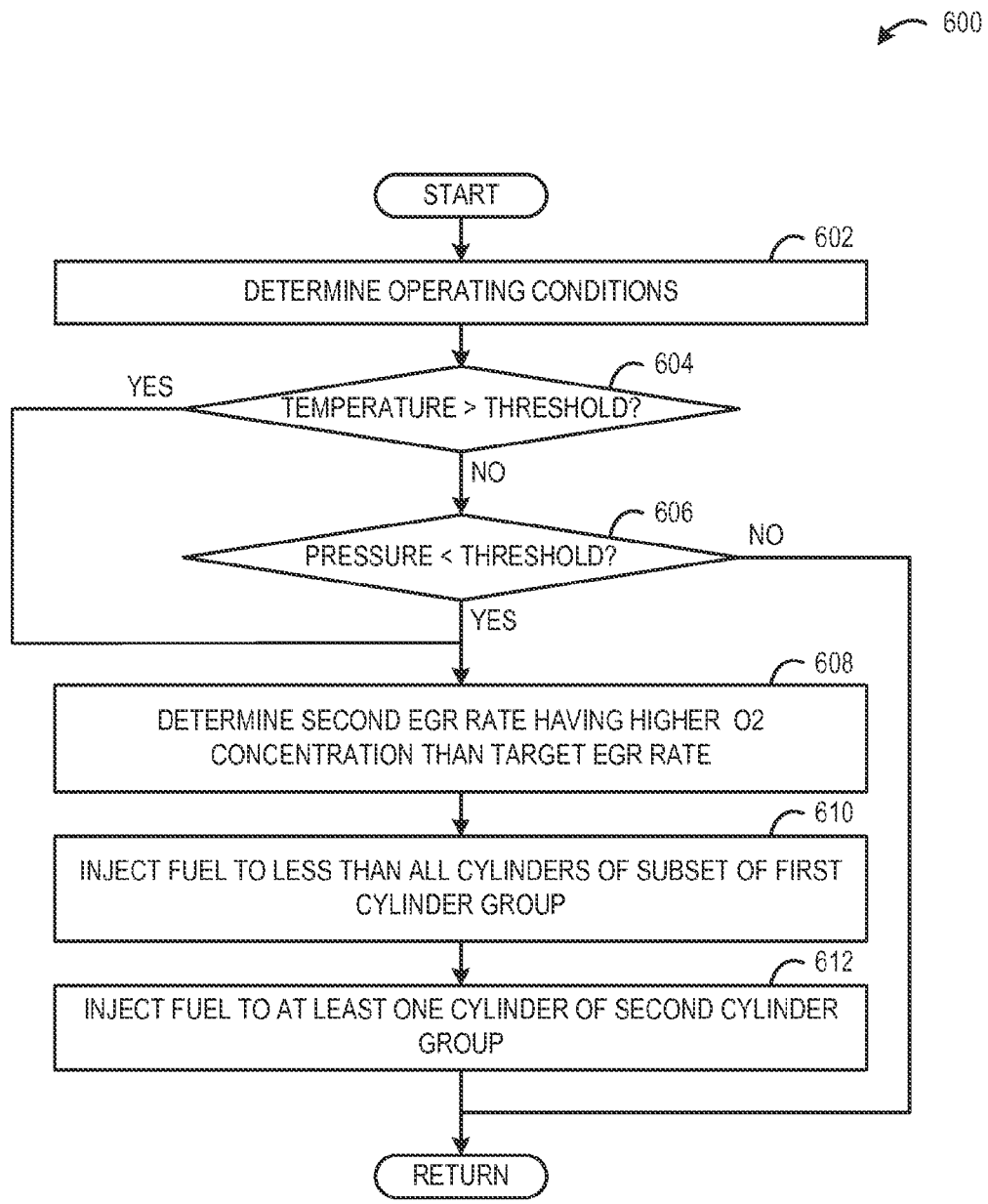
FIG. 6 shows a flow chart of another embodiment of a method for controlling EGR in an engine by skip firing based on a temperature or pressure condition.

FIG. 6 shows a flow chart of an embodiment of a method 600 for controlling EGR in an engine during various temperature or pressure conditions. In one embodiment, the method 600 is executed by the controller 132 in FIG. 1 or the controller 254 in FIG. 2. At 602, the method 600 includes determining operating conditions. The method 600 is executed alone or in combination with the method 300 shown in FIG. 3.

At 604, the method 600 includes determining whether a temperature is greater than a temperature threshold value. For example, the temperature may be an ambient temperature and the temperature threshold value ranges from 25-50° C. In another example, the temperature is an engine coolant temperature and the temperature threshold value ranges from 100-120° C. If it is determined that the temperature is greater than the temperature threshold value, then the method 600 moves to 608. Otherwise the method 600 moves to 606.

At 606, the method 600 includes determining whether a pressure is less than a pressure threshold value. For example, the pressure may be an ambient pressure. If it is determined that the pressure is less than the pressure threshold value, then the method 600 moves to 608. Otherwise the method 600 returns to other operations.

At 608, the method 600 includes determining a second EGR rate that has a higher oxygen concentration than the target EGR rate. For example, the target EGR rate is determined based on operation at lower temperatures or higher pressures.

At 610, the method 600 includes injecting fuel to less than all cylinders of the subset of cylinders of the first cylinder group to obtain the second EGR rate.

At 612, the method 600 includes injecting fuel to at least one cylinder of the second cylinder group. In one embodiment, the method includes injecting fuel to each cylinder of the second cylinder group.

By skip firing more cylinders that provide EGR during adverse ambient environmental conditions (e.g., high temperature or low density air), heat load on the EGR cooler is reduced. In this way, performance of the engine is increased.

In another embodiment, a method includes during a first condition, injecting fuel to each cylinder of a first cylinder group. The first cylinder group provides exhaust gas through an EGR passage structure fluidly coupled between the first cylinder group and an intake passage structure. The method further includes injecting fuel to each cylinder of a second cylinder group. The second cylinder group provides substantially no exhaust gas through the EGR passage structure. For example, the second cylinder group provides exhaust gas to the atmosphere through an exhaust passage structure. As another example, the second cylinder group may provide exhaust gas to the intake passage structure through a turbocharger bypass instead of through the EGR passage, under some conditions. The method further includes adjusting a fuel injection amount to at least one cylinder of the first cylinder group to obtain a first EGR rate. The method further includes during a second condition, injecting fuel to a subset of cylinders that includes less than all cylinders of the first cylinder group, injecting fuel to each cylinder of the second cylinder group, and adjusting a fuel injection amount to at least one cylinder of the subset of cylinders of the first cylinder group to obtain a second EGR rate that has a higher oxygen concentration than the first EGR rate.

In one example, the first condition includes an engine speed being greater than a speed threshold value and the second condition includes at least one of a tunnel condition, an ambient temperature being greater than a temperature threshold value, or an ambient air pressure being less than a pressure threshold value. Furthermore, the method includes during the second condition, adjusting a fuel injection amount to at least one cylinder of the second cylinder group dependent upon the first cylinder fuel injection adjustment to attain or maintain a target torque output provided by the first cylinder group and the second cylinder group.

Another embodiment relates to a method, e.g., a method for controlling an engine. The method comprises skip firing a first cylinder group, and combusting fuel in at least one cylinder of a second cylinder group. The first cylinder group provides exhaust gas through an EGR passage structure fluidly coupled between the first cylinder group and an intake passage structure. The second cylinder group provides substantially no exhaust gas through the EGR passage structure. The first cylinder group is exclusive of the second cylinder group, that is, none of the cylinders of the first group are also cylinders of the second group. The step of skip firing comprises, in a first combustion cycle, exclusively combusting fuel in a first subset of the first cylinder group that includes less than all cylinders of the first cylinder group. "Exclusively" combusting means that in a given combustion cycle, fuel is combusted in a given subset of the first cylinder group but not combusted in the cylinders of the first cylinder group that are not within the given subset. The step of skip firing further comprises, in a successive, second combustion cycle, exclusively combusting fuel in a second subset of the first cylinder group that includes less than all the cylinders of the first cylinder group. The second subset is at least partially different than the first subset, that is, at least one cylinder of the second subset is not also part of the first subset; in embodiments, the first subset is exclusive of the second subset, meaning no cylinders of the first subset are also part of the second subset. In further successive combustion cycles, the first and second subsets are alternately exclusively combusted, possibly sequentially with other, additional subsets of the first cylinder group (that are at least partially different then the first and second subsets), and possibly alternating with combustion cycles where fuel is combusted in all the cylinders of the first cylinder group. In other embodiments, the method further comprises, for a given subset of the first cylinder group that is being exclusively combusted in a given combustion cycle, adjusting a fuel injection amount to at least one cylinder of the given subset to obtain a target EGR rate.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   injecting fuel to a subset of cylinders that includes less than all cylinders of a first cylinder group to obtain a target exhaust gas recirculation (EGR) rate, wherein the first cylinder group provides exhaust gas through an EGR passage structure fluidly coupled between the first cylinder group and an intake passage structure; and
   injecting fuel to at least one cylinder of a second cylinder group, wherein the second cylinder group provides substantially no exhaust gas through the EGR passage structure.

2. The method of claim 1, further comprising:
   adjusting a first fuel injection amount to at least one cylinder of the subset of cylinders of the first cylinder group to obtain the target EGR rate.

3. The method of claim 2, further comprising:
   adjusting a second fuel injection amount to the at least one cylinder of the second cylinder group dependent upon the first cylinder group first fuel injection amount adjustment to attain or maintain a target torque output provided by the first cylinder group and the second cylinder group.

4. The method of claim 2, wherein injecting fuel to the subset of cylinders of the first cylinder group includes injecting fuel to the subset of cylinders of the first cylinder group during a first combustion cycle and injecting fuel to each cylinder of the first cylinder group during a second combustion cycle to obtain the target EGR rate.

5. The method of claim 1, further comprising:
   in response to a determined operating condition, injecting fuel to less than all cylinders of the subset of cylinders of the first cylinder group to obtain a second EGR rate that has a higher oxygen concentration than the target EGR rate.

6. The method of claim 5, further comprising:
   in response to the determined operating condition, injecting fuel to the less than all cylinders of the subset of cylinders of the first cylinder group to obtain a target power level.

7. The method of claim 1, further comprising:
   in response to an ambient temperature being greater than a temperature threshold value or an ambient air pressure being less than a pressure threshold value, injecting fuel into less than all cylinders of the subset of cylinders of the first cylinder group to obtain a second EGR rate that has a higher oxygen concentration than the target EGR rate.

8. The method of claim 1, wherein the target EGR rate is determined based on one or more of engine load, engine speed, combustion stability, particulate matter concentration, intake manifold oxygen concentration, or NOx emissions.

9. A system comprising:
   an engine;
   a plurality of fuel injectors operable to inject fuel into cylinders of a first cylinder group and cylinders of a second cylinder group of the engine;
   an intake passage structure coupled to the first cylinder group and the second cylinder group;
   an EGR passage structure coupled between the first cylinder group and the intake passage structure;
   an exhaust passage structure coupled to the second cylinder group;
   a controller configured to control injection of fuel to a subset of cylinders that includes less than all cylinders of the first cylinder group to obtain a target EGR rate, the control of the injection including injecting fuel to less than all cylinders of the first cylinder group, wherein the controller is further configured to control injection of fuel to at least one cylinder of the second cylinder group.

10. The system of claim 9, wherein the controller is configured to adjust a first fuel injection amount to at least one cylinder of the subset of cylinders of the first cylinder group to obtain the target EGR rate.

11. The system of claim 10, wherein the controller is configured to adjust a second fuel injection amount to the at least one cylinder of the second cylinder group dependent upon the first cylinder fuel injection adjustment to attain or maintain a target torque output provided by the first cylinder group and the second cylinder group.

12. The system of claim 10, wherein the controller is further configured to control injection of fuel to the subset of cylinders of the first cylinder group during a first combustion cycle and control injection of fuel to each cylinder of the first cylinder group during a second combustion cycle to obtain the target EGR rate.

13. The system of claim 9, wherein the controller is configured to, in response to a tunnel condition:
determine a second EGR rate that has a higher oxygen concentration than the target EGR rate; and
control injection of fuel to less than all cylinders of the subset of cylinders of the first cylinder group to obtain the second EGR rate.

14. The system of claim 13, wherein the controller is configured to, in response to the tunnel condition:
determine a target power level; and
control the injection of fuel to the less than all cylinders of the subset of cylinders of the first cylinder group to obtain the target power level.

15. The system of claim 9, wherein the controller is configured to, in response to an ambient temperature being greater than a temperature threshold value or an ambient air pressure being less than a pressure threshold value, control injection of fuel to less than all cylinders of the subset of cylinders of the first cylinder group to obtain a second EGR rate that has a higher oxygen concentration than the target EGR rate.

16. The system of claim 9, wherein the controller is configured to determine the target EGR rate based on one or more of engine load, engine speed, combustion stability, particulate matter concentration, intake manifold oxygen concentration, or NOx emissions.

17. The system of claim 9, wherein the EGR passage structure does not include a control device operable to control flow of exhaust gas to the intake passage structure.

18. A method, comprising:
during a first condition, injecting fuel to each cylinder of a first cylinder group, wherein the first cylinder group provides exhaust gas through an exhaust gas recirculation (EGR) passage structure fluidly coupled between the first cylinder group and an intake passage structure, injecting fuel to each cylinder of a second cylinder group, wherein the second cylinder group provides substantially no exhaust gas through the EGR passage structure, and adjusting a fuel injection amount to at least one cylinder of the first cylinder group to obtain a first EGR rate; and
during a second condition, injecting fuel to a subset of cylinders that includes less than all cylinders of the first cylinder group, injecting fuel to each cylinder of the second cylinder group, and adjusting a fuel injection amount to at least one cylinder of the subset of cylinders of the first cylinder group to obtain a second EGR rate that has a higher oxygen concentration than the first EGR rate.

19. The method of claim 18, wherein the first condition includes an engine speed being greater than a speed threshold value and the second condition includes at least one of a tunnel condition, an ambient temperature being greater than a temperature threshold value, or an ambient air pressure being less than a pressure threshold value.

20. The method of claim 18, further comprising:
during the second condition, adjusting a fuel injection amount to at least one cylinder of the second cylinder group dependent upon the at least one cylinder of the subset of cylinders of the first cylinder group fuel injection adjustment made during the second condition to attain or maintain a target torque output provided by the first cylinder group and the second cylinder group.

21. A method, comprising:
skip firing a first cylinder group, wherein the first cylinder group provides exhaust gas through an exhaust gas recirculation (EGR) passage structure fluidly coupled between the first cylinder group and an intake passage structure; and
combusting fuel in at least one cylinder of a second cylinder group, wherein the second cylinder group provides substantially no exhaust gas through the EGR passage structure, and wherein the first cylinder group is exclusive of the second cylinder group;
wherein the step of skip firing comprises:
in a first combustion cycle, exclusively combusting fuel in a first subset of the first cylinder group that includes less than all cylinders of the first cylinder group; and
in a successive, second combustion cycle, exclusively combusting fuel in a second subset of the first cylinder group that includes less than all the cylinders of the first cylinder group, wherein the second subset is at least partially different than the first subset.

* * * * *